United States Patent [19]
Burg et al.

[11] 3,834,549
[45] Sept. 10, 1974

[54] STRUCTURAL SYSTEM

[75] Inventors: Robert J. Burg, Hartsdale; Milton Lieberman, Blauvelt; Armand A. Fiorenza, Wantagh, all of N.Y.

[73] Assignee: Gordon Tube Products Company, Inc., Bronx, N.Y. ; by said Lieberman

[22] Filed: Sept. 25, 1972

[21] Appl. No.: 291,972

[52] U.S. Cl.................. 211/148, 108/111, 211/182, 403/218
[51] Int. Cl............................. A47f 5/00, F16b 7/00
[58] Field of Search.................... 211/148, 182, 134; 108/111; 403/218, 217, 171–172, 176; 46/29; 52/646, 645

[56] References Cited
UNITED STATES PATENTS

| | | | |
|---|---|---|---|
| 1,460,928 | 7/1923 | Tilden | 211/182 X |
| 2,018,539 | 10/1935 | Welsh | 403/218 |
| 2,683,329 | 7/1954 | Kobler | 403/218 X |
| 2,839,320 | 6/1958 | Hill | 403/172 |
| 2,913,128 | 11/1959 | Milner | 108/111 |
| 3,207,098 | 9/1965 | Alpert | 108/111 |
| 3,268,252 | 8/1966 | Rolland | 211/182 X |
| 3,323,820 | 6/1967 | Braccini | 403/218 |

FOREIGN PATENTS OR APPLICATIONS

| | | | |
|---|---|---|---|
| 1,088,255 | 9/1960 | Germany | 211/182 |

*Primary Examiner*—Ramon S. Britts
*Attorney, Agent, or Firm*—Watson Leavenworth Kelton & Taggart

[57] ABSTRACT

A structural system in which a three-dimensional framework of horizontal stringers and vertical struts are connected in the region of intersection of the struts and stringers by a cube-shaped hollow connector made of two separable complementary connector parts. The connector is provided with socket passages in each of its six sides for receiving the tip ends of the struts and stringers and further has retainer means for preventing withdrawal of horizontal stringers with a fastener being employed within the connector to connect vertical struts received in the connector.

21 Claims, 13 Drawing Figures

PATENTED SEP 10 1974 3,834,549

STRUCTURAL SYSTEM

BACKGROUND OF THE INVENTION

Structural systems and the skeletal components used for construction of such systems are well known, there being known in the art various forms of framework members, joints for connecting the same, and particular arrangements and patterns of joining together of such members for specified purposes. In respect of shelving systems intended for use in the home in a living space such as a living room, it is desirable that the framework be of relatively simple construction, inexpensive to make, readily suitable for erection and dismantling by the ordinary user without recourse to use of assorted or special tools and without requiring need for other than a normal degree of skill, dexterity or training on the part of the user. Further, the system should involve the use of a minimum of components for establishing the framework on which shelf components can be received and supported. Finally, the framework should possess inherent ruggedness and structural integrity as to render it suitable for use in supporting substantial loading thereon, notwithstanding employment of relatively small framework members. In addition to all of the foregoing, the construction of the system preferably should avoid use of obviously protuberant components so that the overall integrated structure has an attractive appearance rendering the system suitable for use in living spaces without detracting from the overall decorative character of such spaces. Such attributes also are desirable for skeletal structures useful in other fields, e.g. in commercial window decorations. While there are known in the prior art various forms of shelving systems and framework components employed therein, no single system embodies features of construction which simply and inexpensively provide all of the aforementioned desirable characteristics.

SUMMARY OF THE INVENTION

The present invention is concerned with a structural system and more particularly relates to a framework structure suitable, among other things, for supporting shelf components and to the construction of the components used for erecting such framework.

The present invention provides a framework which is easy to erect and dismantle and has clean lines and a pleasing appearance. It employs a plurality of horizontal stringers and vertical struts joined together in three-dimensional array by means of a connector that simplifies the erection and dismantling of same, as well as insures optimum strength in the overall framework structure when used for supporting loads.

In accordance with the present invention, a plurality of vertically arranged struts and horizontally arranged stringers are disposed in spaced apart three-dimensional intersecting array to define a framework for receiving and supporting a variety of components; the struts and stringers at their intersections with other struts and stringers being received in special connectors which form joints for the respective intersecting stringers and struts. The struts and stringers desirably are standardized components provided in the form of elongated rods or tubes or similar structural shapes.

In one form, the connector is comprised of two separable complementary parts which interfit to form a block-shaped body preferably in the form of a cube, having a hollow interior and six outer faces. Four of the faces of the body are associated with the reception and retention of the horizontal stringers, while the remaining two outer faces of the body are associated with the reception and retention of the vertical struts. For the purposes of receiving the stringers each of the four outer faces associated with reception of stringers has an opening therein and a corresponding side passage extending inwardly from the face opening to communication with the hollow interior of the body and defining a stringer socket for receiving a tip end of one of the stringers. Similarly, each of the faces associated with reception of struts is provided with an opening and a corresponding fastener passage extending inwardly from the face opening, communicating with the interior of the body and defining a strut socket.

The stringer passages may be provided with retainer means therein which are cooperative with companion means on the tip ends of received stringers to limit or eliminate axial movement of the stringers and to prevent their withdrawal from the stringer passages. The retainer means in the stringer passages can take various forms, for example, the same may be provided as one or more projections extending radially inwardly in the stringer passage with the projections being receivable in detent openings in the tip ends of the received horizontal stringers.

Preferably the two separable complementary connector parts which comprise the connector are made as identical components, that is, the connector parts are essentially semi-cubic shaped members, each including one complete body outer face and additionally a part of each of four other outer faces. Further, each connector part has a mating surface remote from its complete body outer face, which mating surface is juxtaposed to a similar mating surface on another connector part when the parts are interfitted with each other. Additionally, the connector parts can be provided with locator means at the mating surfaces of each to effect proper registration of the parts for interfitting the same.

The fastener passages in the body are each provided with an abutment stop to limit the degree of strut entry into such passage. When two connector parts are assembled to form one connector the fastener passages are in axial alignment to provide through access therebetween within the connector for reception of fastener means for connecting the tip ends of two opposing the struts received through two opposed side faces. Such fastener, in addition, serves to hold the interfitted connector parts and stringers received therein in secure assembled condition. The fastener can be provided in various forms, for example, if the struts are tubular components, the fastener can be a threaded member, i.e., a stud which is received in internal screw threads formed in the opposing tip ends of the opposing struts received in the associated strut sockets. The fastener can also be an externally threaded reduced diameter integral part of one of the struts which is threadable into the opposing threaded hollow end of the other strut. On the other hand, the fastener can be in the form of a bolt for use where only one strut is received in the connector, for example at the upper extremity of the framework, in which instance the head of the bolt will extend outside the opening of the opposed fastener passage to form an anchorage for securing the said one received strut securely in the connector.

In accordance with the invention the connector can be made in a modified form in which the retainer means associated with the horizontal stringer-receiving socket passages instead of having projections therein for retaining the tip ends of the horizontal stringers are provided with enlarged recesses at a location interiorly remote from the respective associated outer face, and in which recesses are received companion flanges formed at the tip end of a received stringer.

Other features of the invention include contouring of the socket passages conformably to the exterior shape of the struts and stringers received therein, such contours, e.g., being in the form of cylindrical surfaces. To facilitate reception of shelf components on the horizontal stringers, the latter can be provided with suitable spring clips which serve to receive shelf components nestably between stringers.

The invention accordingly comprises the structural system framework and connector employed therein which possesses the features, properties and relations of elements which will be exemplified in the system hereinafter described and the scope of the invention will be indicated in the claims.

BRIEF DESCRIPTION OF THE DRAWINGS

Features of the invention will in part be obvious and will in part appear from the following detailed description taken in conjunction with the accompanying drawings, wherein like reference numerals identify like parts throughout and in which.

DESCRIPTION OF THE PREFERRED EMBODIMENTS

The present invention is concerned generally with a structural system and components used for the erection of such systems, it being particularly concerned with a framework structure in such systems suitable for receiving and supporting shelf components. The framework structure is characterized by its simplicity which is facilitated by use of only one type of connector in conjunction with rod-shaped struts and stringers, the structure further being easily and readily erected by the average person without recourse to use of special tools and/or skills. Furthermore, the invention is concerned with a framework structure which is particularly suited for use in living spaces in residential dwellings, its simplified construction providing an attractive appearance. As will appear, the framework structure additionally is capable of use under conditions of heavy loading because the manner of arranging such components provides inherent structural strength and rigidity which renders the framework suitable for commercial and industrial usage.

Figure 1:
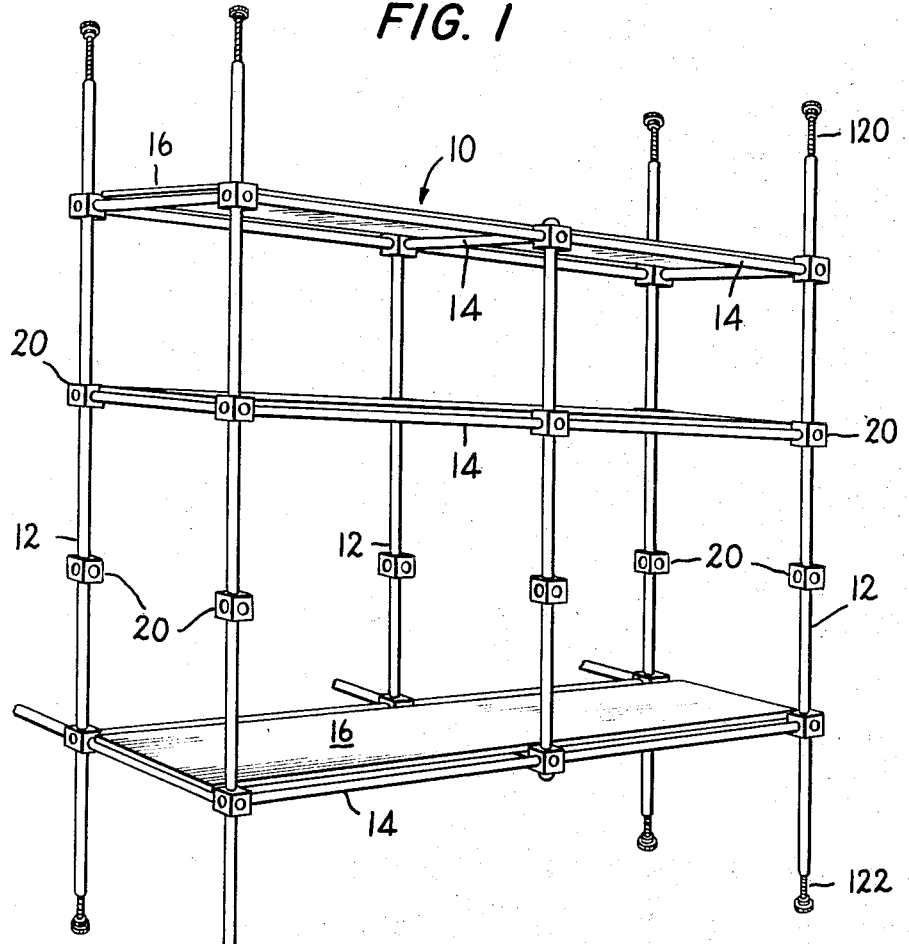
FIG. 1 is a perspective view of a framework structure made in accordance with the principles of the present invention.

Referring now to FIG. 1, there is depicted a structure comprising a plurality of vertically arranged struts 12 and horizontally arranged stringers 14 disposed in spaced apart three-dimensional intersecting array and defining a framework 10 for receiving and supporting shelf components 16, each strut 12 and stringer 14 being received in the region of its intersection with another strut 12 and stringer 14 in a connector 20 which connector serves to join securely the respective stringers and struts in a single integrated, rugged framework structure having load bearing capabilities.

The struts 12 and stringers 14 can within the scope of the invention be provided in various forms and be made of various materials. Thus, the struts 12 and stringers 14 can be elongated steel rods, tubular rods, rods of square, circular or even hexagonal cross-section and the like. Also the struts and stringers can have decorative outer finishes, e.g., chrome finish surfaces, and the stringers and struts may be provided in such dimension as is required to provide a framework capable of sustaining a specified loading. Generally, standard, readily available structural shapes can be employed for use as the stringers and struts, such shapes being modified when required to an extent as will appear herein so as to adapt them for use in the framework in conjunction with the connectors 20.

The shelf components 16 can be provided in a number of forms but in general are elongated relatively flat, relatively thin members adapted for nesting on and/or between certain ones of the horizontal stringers 14.

Figure 2:
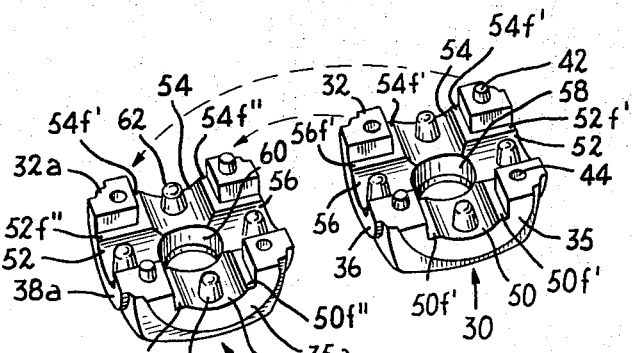
FIG. 2 is a perspective view depicting one form of the two separable complementary connector parts which interfit to form a block-shaped connector in which is received tip ends of the horizontal stringers and vertical struts of the framework shown in FIG. 1.
Figure 3:
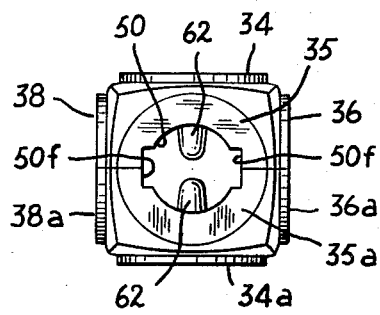
FIG. 3 is a side elevational view of the connector element shown in FIG. 2 after the separable connector parts have been interfitted but without having any struts and/or stringers received therein.
Figure 4:
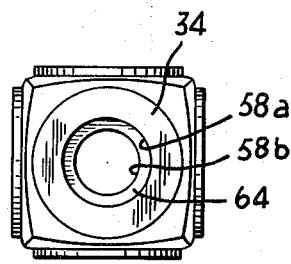
FIG. 4 is a top plan view of the connector shown in FIG. 3.
Figure 5:
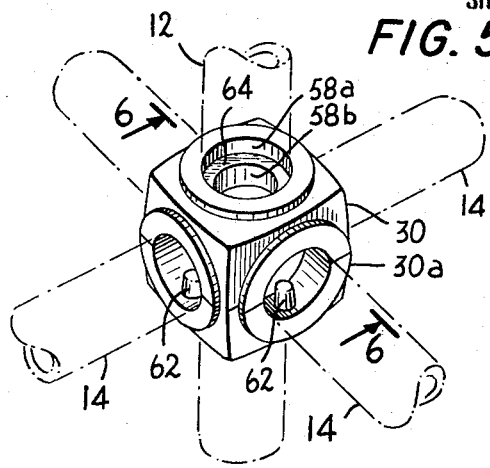
FIG. 5 is a perspective view of two connector parts shown in assembled interfitted condition.

An important component of the present invention is the connector 20, the constructional details of which are depicted in FIGS. 2–4. Referring now with greater detail to FIG. 2, the connector 20 is comprised of two separable complementary connector parts 30 and 30a which interfit along mating surfaces 32, 32a respectively to form a block-shaped body having a hollow interior. Conveniently and desirably, each connector part 30, 30a is identical with the other, with each part being made as a semi-cubic shaped element having one outer face 34, 34a defining one side of a cube and part of each of four of the other outer faces of the cube, such four partial surfaces being identified by the reference numerals 35,36,37,38 and 35a,36a,37a,38a. The mating surfaces 32,32a of the two connector parts 30,30a and which are juxtaposed when the parts are interfitted, are defined by flats formed at the four inner corners of the connector part, such flats being remote from the outer complete face 34, 34a of the associated connector part 30, 30a. While other configurations are suitable, the mating surface flats preferably are all in planes which are parallel to the planes of the outer faces 34 and 34a. Although not a necessary element, it has been found that to facilitate mated interfitting of the two complemental parts 30 and 30a, it is preferable to provide alignment means. In FIG. 2 mating surfaces 32, 32a of connector parts 30 and 30a are provided with locator pins 42 and complemental blind bore openings 44 which serve as alignment means. It should also be noted that the stringer retention means (e.g. projections 62 and stringer companion receivers discussed below) may also serve as alignment means.

When interfitted, the two connector parts 30, 30a essentially define a cubic-shaped, block-like body having a hollow interior and six raised outer faces, 34—34a, 35—35a, 36—36a, 37—37a and 38—38a. The hollow interior of the body is formed by the presence of concavities in each connector part inwardly from the mating surfaces 32,32a, which, when the parts are interfitted, define sockets in the body. The socket passages extend inwardly from openings at the outer faces of the body. There are four such concavities in each connector part to define, in the assembled or interfitted body, four socket passages 50, 52, 54, 56 associated with reception of horizontal stringers 14 (see FIG. 7). Each connector part also contains one of the two fastener passages 58 and 60 found in the assembled body for reception of the vertical struts 12. As will be noted from FIGS. 2–4, each outer face of the block-shaped body is provided with an opening therein which communicates with the associated socket or fastener passage.

Each socket passage 50, 52, 54, 56 is designed to receive a tip end of one of the horizontal stringers 14 and each socket passage as can be seen in FIG. 3, includes means for retaining the tip end of such received horizontal stringer. The retainer means in the embodiment of FIGS. 2–5 is comprised of one pair of projections 62 for each horizontal stringer to be retained, formed integrally with the connector parts 30, 30a and extending radially inwardly in the socket passage for reception in companion means in the stringer tip end. The companion means may be in the form of two juxtaposed radial holes in tip ends of hollow stringers, or one hole through the tip ends of solid stringers. Alternatively, the companion means may be comprised of circumferential detents in the tip ends of the received horizontal stringers. A similar form of retainer means is comprised of a circumferential projection (not shown) in each socket passage also formed integrally with the connector parts 30, 30a for use with circumferential detent companion means. Whatever form the companion means take, they are so constructed as to be suitable for receiving the retainer means provided on the connector.

Alternatively, retention of stringers in the socket passages may be accomplished by designing the connector parts so that, when assembled, friction between the internal surfaces of the socket passages and the external surfaces of the stringers prevents movement of the latter. Frictional retention can be assured by slightly reducing the heights of mating surfaces 32 and 32a, perhaps by one or two thousandths of an inch. By so doing, when connector parts 30 and 30a are assembled over one or more stringers the first contact made is that between connector parts and stringers. Then, application of force urging connector parts together (as by tightening up on the struts) causes sufficient friction to retain the stringers in the connector. This method of retaining stringers also provides means of compensating for slight malformation of stringers.

It will be appreciated that these methods for retaining stringers are merely illustrative of the many which can be used in connection with the practice of the instant invention. In addition, it should be noted that employment of one retention method does not necessarily preclude simultaneous use of one or more others. For example, projections 62 may be formed on connector parts having reduced height mating surfaces.

Each opposed fastener passage 58 and 60 associated with reception of the tip end of a vertical strut 12 consists of a large diameter outer segment 58a and 60a respectively, each communicating with a reduced diameter inner segment 58b and 60b respectively. A strut-engaging abutment stop 64 is shown in the form of an annular shoulder which is the transition surface between segments 58a and 58b and between segments 60a and 60b as can be seen in FIG. 4.

In addition, each socket passage is provided with opposed internal clip flats 50f, 52f 54f and 56f. Part of each clip flat is formed in each of the two connector parts 30 and 30a. Clip flat 50f is made up of partial flats 50f' and 50f''. Similarly, flat 52f is made up of partial flats 52f' and 52f''; flat 54f of partial flats 54f' and 54f'' and flat 56f of partial flats 56f' and 56f''. These flats are provided to receive and retain clips some of which are specially designed to receive shelves and others to receive vertical separators.

Figure 6:
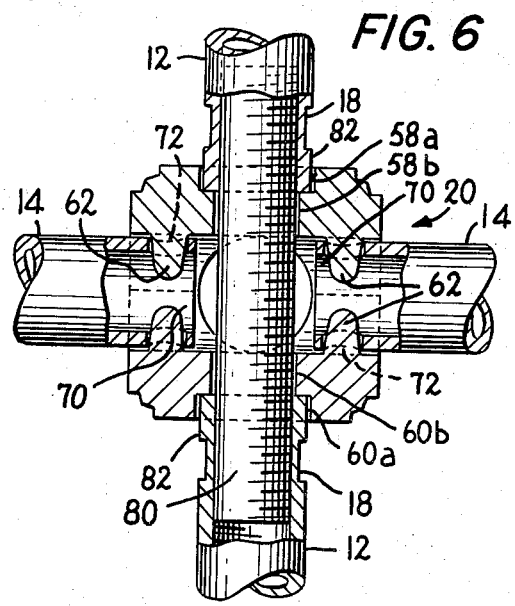
FIG. 6 is a vertical sectional view of the connector shown in FIG. 5 as taken along the lines 6—6 in FIG. 5, there being shown in received condition in the connector the tip ends of two horizontal stringers and the tip ends of two vertical struts, the latter being shown connected to a fastener disposed within the connector.

FIG. 6 depicts the manner in which the tip ends of one pair of struts 12 and one pair of stringers 14 are received in the connector 20 in the region of intersection of such stringers and struts. The tip ends 70 of horizontal stringers 14 are received in the socket passages 50,54 of the cubic block-shaped body of connector 20, with the socket passages preferably being contoured conformably with the external surface of the received stringer tip end, as for example, being cylindrical in configuration to receive similarly configured tubular horizontal stringers 14. With the stringer tip end 70 received in a socket passage, the retainer projections 62 in the latter will be received in the detent openings 72, shown as radial holes, in the stringer tip ends. Further, the vertical struts 12 which are received in the connector 20 through the top and bottom side faces 34,34a of the block-shaped body, are secured in the connector or otherwise connected together by a fastener 80. The fastener passages 58,60, when the connector parts are interfitted, are arranged in axial alignment to provide through access within the connector body between these passages. The fastener 80 can be provided in various forms. The embodiment depicted is a stud having an external screw thread. The tip ends 82 of the struts are provided with internal threads designed to mate with the fastener threads.

Alternatively, fastener 80 may be merely a reduced diameter integral extension of one of the struts with the opposing strut end being provided with a mating internal thread. When this embodiment is employed, each strut has an internal thread at one end and external thread at the other.

Figure 7:
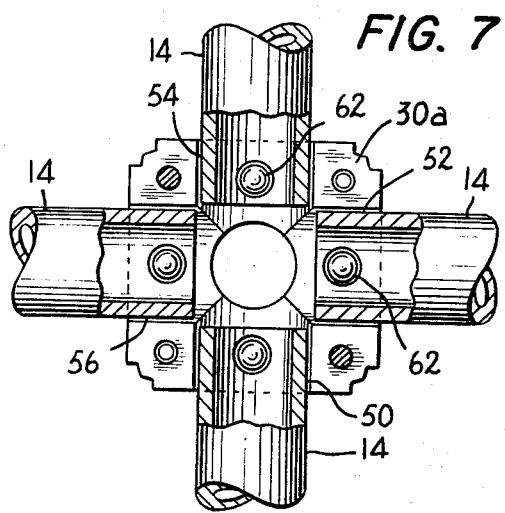
FIG. 7 is a plan view of one of the two connector parts, namely, the lower part, there being shown in received position in such lower part four horizontal stringers.

FIG. 7 shows in plan view the manner in which four horizontal stringers 14 are received in a connector 20.

When assembling or erecting the framework structure 10 one or more horizontal stringers are received first in a lower half connector part 30, with the projections 62 in the socket passageways of the connector part being received in the detent openings 72 in the tip ends 70 of the stringers 14. The upper half of the connector, i.e., connector part 30a is then placed on top of the lower part in complemental arrangement; that is to say, with the locator pins 42 of one connector part being received in the blind bore openings 44 in the other connector part. A vertical strut carrying a fastener 80 at its end is then inserted in the fastener passage 60 with the strut being received in the larger diameter passage 60a with the fastener passing through reduced diameter passage 60b, through the hollow interior of connector 20, through reduced diameter passage 58b and into large diameter passage 58a. The vertical strut 12 associated with the opposing outer face 34 of the connector is then inserted into large diameter passage 58a and against fastener 80. The second vertical strut 12 is then threaded onto fastener 80 until its tip end tightly engages abutment stop 62 associated with the upper socket passage 58. Flats 18 are provided on struts 12 to facilitate tightening with a wrench and, if necessary, to provide the force needed when employing the friction method (reduced mating surface height described above) for retaining stringers. Instead of flats 18, a hole can be provided for use with a spanner wrench.

The fastener 80 thus functions not only to hold the tip ends of opposed vertical struts 12 securely together and in connector 20 against the abutment stops of the corresponding fastener passageways, but the same also acts to maintain the connector parts 30, 30a in tight interfitted relationship and thereby to retain the horizontal stringers 14, which are received in the connector, securely in place in the socket passageways associated with such horizontal stringers.

Figure 8:
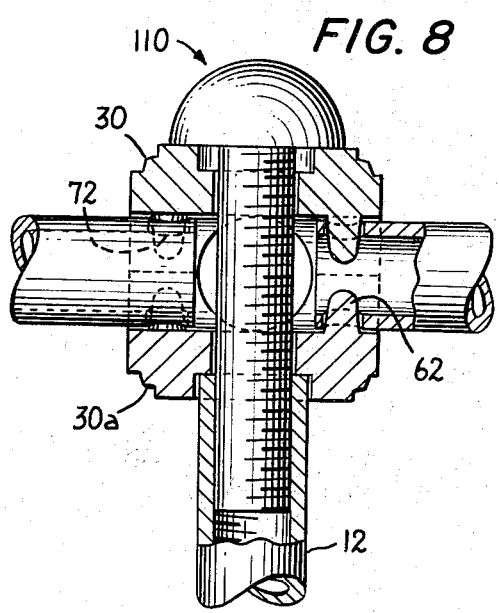
FIG. 8 is a vertical sectional view of the connector shown in FIGS. 5–7 depicting employment of a fastener which secures one vertical strut in the connector when only one of the latter is to be received in the connector, such fastener advantageously being used at upper margin joints of the framework.

FIG. 8 shows an alternative form of Fastener 110 designed for use in conjunction with securing together of the connector parts 30, 30a where but a single vertical strut is to be employed; that is at one vertical terminus of framework 10. Such fastener 110 is provided in the form of a bolt which passes vertically through from one outer face 34a of the body into the strut 12 received through the opposite side face 34. The enlarged head portion 112 of the bolt abuts against the outer face 34a to provide anchorage for holding the vertical strut 12 in the connector in tight engagement therewith, and to hold connector parts 34, 34a together. Use of fastener 110 is particularly advantageous at the top of the framework structure 10.

Alternatively, at the top, the framework can be provided with spring loaded ceiling engagement pads 120. At the bottom, the framework can be provided with screw-jack type leveling devices 122.

Figure 9:
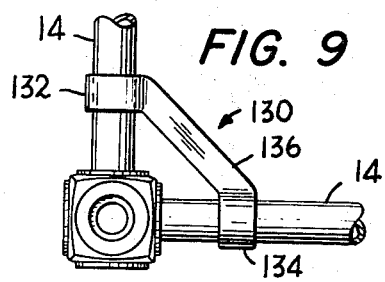
FIG. 9 is a fragmentary top plan view of a spring clip attached to adjacent stringers in a manner suitable for supporting one corner of a shelf nesting between stringers.

FIG. 9 depicts a suitable spring clip 130 for receiving the shelf components 16 on the horizontal stringers 14. The clip is formed with two arcuate end pieces 132, 134 and a central portion 136. The arcs formed by the end pieces are greater than 180° and, when unsprung, the end pieces have an inside diameter slightly less than the outside diameter of the stringer. This configuration of the end pieces permits them to be snapped over the stringers and to be retained thereon.

As shown in FIG. 9, when properly seated the end pieces of a spring clip fit over adjacent stringers and central portion 136 spans the intersection of the stringers. Because of the arcuate configuration of the end pieces, the plane of the central portion can be at or near the lowest part of the stringers. Preferably, for each shelf, four spring clips are used. When a shelf is seated on the clips, the lowered plane of the central portion 136 permits the shelf to nest between stringers in the framework. Other forms of securement of the shelf components to the horizontal stringers could be provided; for example, bolts passing through both the stringer and the shelf component, grooves in the shelf component, etc.

Figure 12:
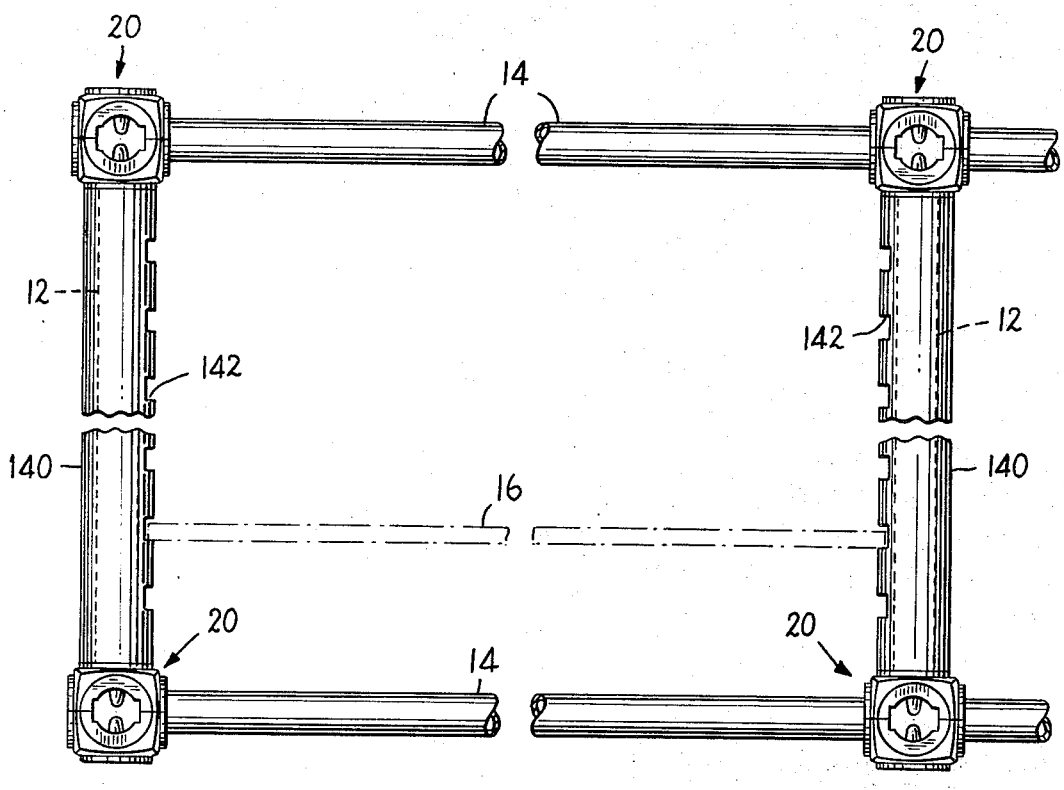
FIG. 12 is a side elevational view of strut sleeves mounted on struts and suitable for slidably maintaining shelves bewteen adjacent levels of stringers.

An alternative means for receiving shelf components is shown in FIG. 12. In this embodiment, each of the four struts, defining the four vertical corners of a rectangular solid module, carries a shelf sleeve 140. Each shelf sleeve is hollow, has an inside diameter slightly larger than the outside diameter of the struts and is of a length equal to that of the length of the large diameter portion of the strut upon which it is to be carried. In addition, each sleeve 140 is provided with notches 142 of such size and configuration as to be adapted slidably to receive shelf components therein.

It should be appreciated that in assembling a structure in accordance with this invention, it is not necessary that each connector carry horizontal stringers. Structures embodying applicants' invention are sufficiently strong and rigid that in many applications intermediate levels of stringers can be dispensed with without interfering with the structures' utility. It is not even necessary to employ stringers at levels where shelves are to be carried. Special shelf clips can be provided which are designed to fit into and to be retained in socket passages which are not carrying stringers.

Figure 10:
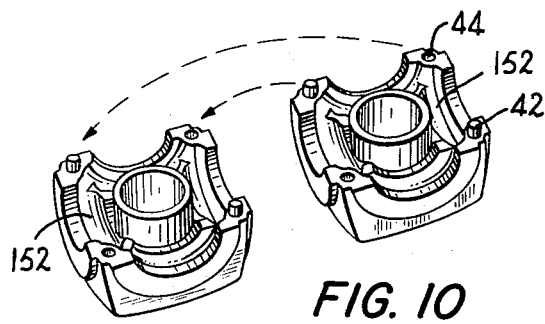
FIG. 10 is a perspective view of a further form of connector element which can be used in the framework of the present invention wherein the horizontal stringers are retained in the connector by means of the cooperative effect of enlarged recesses in the socket passages and companion flanges formed on the tip ends of the horizontal stringers.
Figure 11:
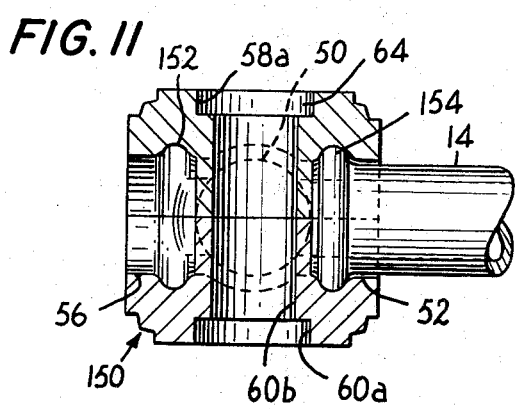
FIG. 11 is a fragmentary vertical sectional view depicting the manner in which the connector shown in FIG. 10 functions to retain the tip ends of horizontal stringers received therein.

FIGS. 10 and 11 depict an alternative form of connector 150 in which the retention of horizontal stringers 14 in the connector is provided by means of enlarged recesses 152 formed in the socket passages 50,52,54 and 56 remote from the faces of the bodies. As shown, the recesses are adapted for reception and retention therein of flanges 154 formed at the tip ends of the received horizontal stringers 14.

The remaining constructional features of the connector 150 shown in FIGS. 10 and 11 are the same as those described earlier in connection with the connector shown in FIGS. 2–5, and the fastener used in conjunction with the connection of the vertical struts functions in the same manner.

Figure 13:
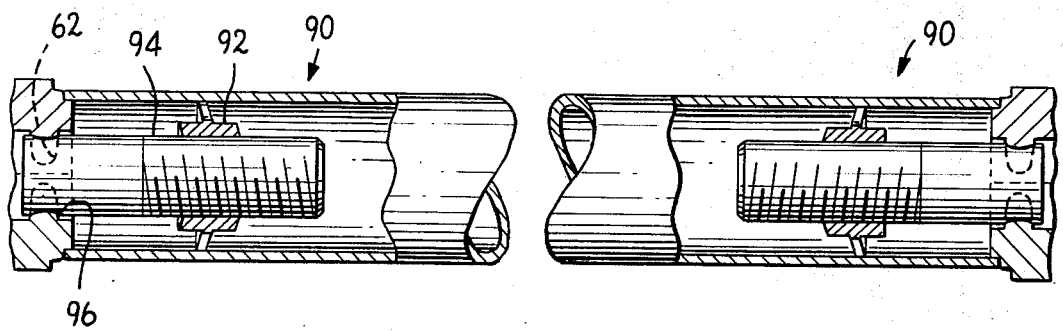
FIG. 13 is a fragmentary side elevational view, partly in section depicting further embodiment of the invention wherein the horizontal stringers are provided in the form of a turnbuckle assembly.

An alternative form of stringer is shown in FIG. 13. In the event it becomes either desirable or necessary to employ stringers and/or struts of a larger size than can be accepted in the socket and fastener passages, the present invention permits their use. As mentioned earlier, connector 20 is provided with raised outer faces 34,34a, 35—35a, 36—36a, 37—37a and 38—38a. These outer faces are designed to mate with larger sized stringers and struts. While they need not necessarily be so, the faces depicted in the drawings are circular and designed to receive cylindrical members. A suitable tubular stringer 90 having an inside diameter approximately the same as the outer diameters of the outside faces is shown in FIG. 13. At each end, stringer 90 is provided with an internally threaded retainer 92 engaged with and movable unitarily with said stringer 90 and an externally threaded mating socket extension 94 received in the retainer 92. Each socket extension 94 is provided at its tip end with detents 96 designed to receive projections 62 when inserted in a socket passage. The opposite ends of stringer 90 are identical except that one retainer 92 and extension 94 have left-hand threads and the other retainer 92 and extension 94 have right-hand threads.

When employed, left extension 94 is placed in the socket passage of a connector with projections 62 seated in detents 96 and the connector halves locked together. Similarly, the other end of stringer 90 is placed and locked in another connector. Then stringer 90 is rotated about its own axis. By virtue of the opposite threads a turnbuckle effect is created permitting the stringer to be drawn up tight over the outer faces of the two connectors and against the bodies of the connectors.

It will become apparent to those in the art that a similar arrangement can be provided for the struts.

In the foregoing discussion the connector has been described as comprised of two elements divided along a horizontal plane. It will be readily apparent to those having ordinary skill in the art that the connector elements can as well be made to meet in a vertical plane. In that event retainer means would be provided in the strut sockets and the fastener means would connect two opposing stringers. Such modification is easily accomplished in view of the foregoing description and should be understood to be within the invention covered hereby.

What is claimed is:

1. A structure comprising a plurality of vertically arranged struts and horizontally arranged stringers disposed in spaced apart three-dimensional intersection array and defining a framework, each strut and stringer being received in the region of its intersection with another strut and stringer in a connector comprising two separable complementary connector parts interfitted forming a block-shaped body having a hollow interior and six outer faces, a first opposed pair of said faces wherein at least one of said faces receives one of said struts, the remaining faces of which are adapted to receive said stringers, each of said remaining outer faces having an opening therein and a corresponding passage extending inwardly from said opening communicating with said hollow interior therewith defining a socket for receiving a tip end of one of said stringers, retainer means comprised of at least one socket passage retainer element integral with one of said connector parts and at least one companion retainer element on said tip end of said stringer, said socket passage retainer element and its connector part defining a one-piece element, said retainer element of said retainer means cooperating to prevent withdrawal of said stringer from said socket passage, each face of said first opposed pair of faces having an opening therein and a corresponding passage extending inwardly from said opening communicating with said hollow interior and defining a fastener passage extending through said connector parts, each fastener passage having a strut-engaging abutment stop therein for limiting strut entry into said fastener passage, and fastener means anchoring said separable complementary connector parts together, said fastener passages associated with said first opposed pair of faces being in axial alignment providing through access therebetween within said connector and receiving said fastener means therethrough, said fastener means being connected to the tip end of at least one of said struts received through at least one of said first opposed pairs of faces, said fastener means serving to both anchor said connector parts to one another and to retain at least one of said struts in the assembled connector.

2. The structure of claim 1 in which said connector is comprised of connector parts which form an essentially cubic-shaped body, said first opposed pair of faces being generally in horizontal planes and disposed to present corresponding socket passage orientation receiving at least one of said struts, the remaining four of the outer faces of said body being generally in vertical planes and disposed to present corresponding socket passage orientation for reception of said stringers.

3. The structure of claim 2 in which said connector parts are essentially semi-cubic shaped members of identical construction, each of which includes a complete one of said first opposed pair of body outer faces and part of each of said remaining four of said body outer faces, each of said connector parts having a mating surface remote from said complete outer face, the mating surfaces of said parts being juxtaposed.

4. The structure of claim 3 wherein each connector part is provided with locator means to effect proper registration of said interfitted parts.

5. The structure of claim 4 wherein said locator means in each connector part includes at least one pin extending outwardly of its mating surface, and at least one bore opening in said mating surface, the pin of one connector part being received in the bore opening of the other.

6. The structure of claim 1 wherein the retainer means in each socket passage comprises at least one projection extending radially inwardly in said socket passage, and at least one detent opening in the tip end of said received stringer, said projection being receivable in said detent opening.

7. The structure of claim 1 wherein the retainer means in each socket passage comprises a recess formed in such passage interiorly of its associated side face opening and extending radially outwardly of said socket passage and a flange at the tip end of said received horizontal stringer, said flange being receivable in said recess.

8. The structure of claim 1 wherein said socket and fastener passages are contoured conformably to the exterior shape of the struts and stringers receivable therein.

9. The structure of claim 8 wherein said socket and fastener passages are cylindrically shaped to receive like externally configured struts and stringers.

10. The structure of claim 1 wherein at least one of the struts received through at least one of said first opposed pair of faces has an axial passage at least at the tip ends thereof, said fastener means being received in said axial passage.

11. The structure of claim 10 wherein said fastener means includes a threaded element received in a companion threaded portion of a received strut.

12. The structure of claim 11 wherein said fastener means comprises a threaded bolt received in the tip end of a strut received through one of said first opposed pair of faces, said bolt extending through said fastener passage associated with the other of said opposed faces and having an enlarged head disposed at and retained by said other opposed face.

13. The structure of claim 1 wherein said fastener means comprises an externally threaded element and at least one internally threaded tip end of at least one of said struts, said externally threaded element being connected to one of said struts and being threaded into said internal thread in another of said struts.

14. The structure of claim 13 wherein said externally threaded element is an integral part of one end of one of said struts.

15. The structure of claim 8 wherein each of said struts has a reduced diameter externally threaded element at one end and an internal thread at the other end, said external thread on one end of one of said struts and said internal thread on one end of another of said struts being mated and comprising said fastener means.

16. The structure of claim 1 wherein at least some of said horizontal stringers are provided with means to facilitage reception and retention of shelf components thereon.

17. The structure of claim 16 wherein reception and retention means comprises a clip member engaged on and extending between adjacent intersecting ones of said stringers.

18. The structure of claim 1 further comprising means associated with certain of said struts for reception and retention of shelf components between opposed ones of said struts.

19. The structure of claim 18 wherein said reception and retention means comprises sleeves received on said struts, said sleeves having notches therein, the notches in each sleeve being cooperatively associated with the notches of another for receiving said shelf components.

20. The structure of claim 1 wherein said horizontally disposed stringers comprise a tubular member extending between opposed ones of said connectors, an internally threaded retainer received in at least one end of said tubular stringer in engagement with the inner surface of said stringer and movable unitarily therewith, and an externally threaded socket extension threaded in said retainer, a tip end of said extension being received in a socket passage in one of said opposed connectors, rotation of said stringer about its own axis being effective to draw said one end of said stringer into tight abutment with said one connector.

21. The structure of claim 1 wherein at least one of said horizontally disposed stringers comprises a tubular member extending between opposed ones of said connectors, internally threaded retainer means in both tip ends of said stringer, an externally threaded socket extension threaded into each of said retainer means, one tip end of each of said extensions being received in a socket passage in each of said opposed connectors, the threads on one of said extensions being of opposite hand from the threads on the other of said extensions whereby rotation of said stringer about its own axis draws the opposite ends thereof into tight abutment with said opposed connectors.

* * * * *

UNITED STATES PATENT OFFICE
CERTIFICATE OF CORRECTION

Patent No. 3,834,549    Dated September 10, 1974

Inventor(s) Robert J. Burg, Milton Lieberman, Armand A. Fiorenza

It is certified that error appears in the above-identified patent and that said Letters Patent are hereby corrected as shown below:

Title Page, Item [73] Assignee: After "Gordon Tube Products Company, Inc., Bronx, N.Y." delete "; by said Lieberman"

Signed and sealed this 17th day of December 1974.

(SEAL)
Attest:

McCOY M. GIBSON JR.
Attesting Officer

C. MARSHALL DANN
Commissioner of Patents